United States Patent Office 3,492,257
Patented Jan. 27, 1970

3,492,257
POLYVINYL CHLORIDE TREATED WITH A
FATTY ACID OR SALT THEREOF
Gunther Meyer and Johann Cleeman, Troisdorf-Oberlar, Germany, assignors to Dynamit-Nobel Aktiengesellschaft, Troisdorf, Bezirk-Cologne, Germany, a corporation of Germany
No Drawing. Filed May 26, 1965, Ser. No. 459,982
Claims priority, application Germany, June 3, 1964,
D 44,593
Int. Cl. C08f 47/20
U.S. Cl. 260—23     19 Claims

ABSTRACT OF THE DISCLOSURE

Stabilizing the viscosity of a plastisol by adding a wax-like material having 8 to 22 carbon atoms to polyvinylchloride to obtain an emulsion, heating the emulsion for a period on the order of approximately 60 minutes to a temperature of up to 90° C., drying the emulsion, grinding the dried product thus produced, and admixing the dried product with a softener to produce the plastisol.

This invention relates to a process for the production of polyvinylchloride for use in the production of stable plastisols, to such polyvinylchloride products, to polyvinylchloride plastisols containing the same, and to a process for their preparation.

It is known in the art that more or less viscous pastes can be made from polyvinylchloride which has been prepared according to the emulsion process by comminuting the polyvinylchloride product to certain particle sizes and mixing the comminuted product with a softener. The flow properties of these pastes depend essentially on the particle size distribution of the polyvinylchloride and on the type of softener used. Most of the polyvinylchloride products commercially available and which are suitable for use as so-called "plastisols" have the disadvantage that they are unstable in paste form. This is attributable to the fact that the polyvinylchloride becomes even at room temperature softener-soluble so that even after short periods of time a viscosity increase of the paste is observed. There are required by the art depending on the processing procedures selected both polyvinylchloride products of low viscosity and high viscosity. It is known, for example, that the viscosity of the plastisols can be increased without any influence on their flow properties by the addition of alkali salts of polyacrylic acid. Conversely, by the addition of polyvinylchloride having a greater particle size distribution, the viscosity of the plastisol can be lowered. The regulation of the viscosity in connection wth the desired flow properties (pseudoplastic, thixotropic, newtonic, dilatant or rheopeptic (see Rubber and Plastics Age, February 1961, pages 183–186)) is hardly possible, however, for a given polyvinylchloride product even with different softeners and additions. The attempts to obtain through other additions, such as of polymer solutions or other polyvinylchloride products, the desired regulation of the viscosity are time-consuming and, at best, not reproducible.

Further, most of the polyvinylchloride pastes contain large particles and, therewith, have the disadvantage that they produce spotty plastisols. This results, particularly in connection with the production of thin films therefrom, in irregular surfaces and poor mechanical values of the plasticized material. Still further, they have the disadvantage that the plastisols tend, under use of large quantities of softeners, to sedimentation. In order to avoid these aforesaid disadvantages, the plastisols have had to be homogenized on dye-grinding or similar machines. As a result, however, the resistance to aging is considerably decreased.

An object of the invention is a process for the production of polyvinylchloride powders produced by spray-drying of emulsion polymerizates of vinylchloride which are particularly suitable for use in the preparation of plastisols.

Another object of the invention is the production of polyvinylchloride powders produced by spray-drying from emulsion polymerizates of vinylchloride which are characterized by their resistance to softeners—i.e., which polyvinylchloride powders show very slight softener absorption.

An object of the invention is a process for the preparation of stable plastisols on the basis of polyvinylchloride.

Another object of the invention is the production of stable plastisols especially adapted for use in the manufacture of thin films, coatings, molded and cast plastic bodies, impregnants for fabrics, etc.

A still further object of the invention is the production of plastisols of the type indicated, the viscosity of which is readily regulated.

Other objects and advantages of the invention will be apparent from the following specification in which its preferred embodiments are described.

In accordance with the invention, it has been found that new polyvinylchloride products suitable for use in the production of stable plastisols are obtained by adding to the emulsion polymerizates of vinylchloride a member of the group consisting of fatty acids having from 8 to 22 carbon atoms and preferably 10–18 carbon atoms, their corresponding ammonium or aliphatic amine salts, their corresponding fatty alcohols or mixtures thereof in an amount of from 0.1 to 5% by weight of polyvinylchloride, and preferably 0.5 to 2%, as agent for rendering the polyvinylchloride particles resistant to softeners, drying the resultant emulsion by spray-drying, and grinding the dried product.

Further in accordance with the invention, it has been found that new plastisols resistant to aging are obtained by adding to the emulsion polymerizates of vinylchloride, a member of the group of fatty acids having from 8–22 carbon atoms and preferably 10–18 carbon atoms, their corresponding ammonium or aliphatic amine salts, their corresponding fatty alcohols or mixtures thereof, in an amount of 0.1 to 5% by weight of polyvinylchloride, and preferably from 0.5–2%, as agent for rendering the polyvinylchloride resistant to softeners, drying the resultant emulsion by spray-drying, grinding the dried product and admixing the dried vinylchloride product with a softener to produce the plastisol.

Preferably the polyvinylchloride emulsions containing said fatty acid or derivative thereof are heated before the spray-drying for up to 60 minutes, and more preferably for from 5 to 15 minutes to temperature of up to 90° C.

In accordance with the invention, it has further been found that through the addition of a fatty alcohol to a preformed polyvinylchloride latex, followed by spray-drying of the resulting emulsion followed by addition of, for example, a phthalate softening agent to the dried polyvinylchloride, there is obtained a paste resistant to aging for periods of more than several days. The said paste, in accordance with the amount of fatty alcohol used has a lower viscosity and pseudo-plastic flow properties; in the extreme case the paste having a salve-like nature. These flow properties are particularly desirable in the uni-surface coating or impregnation of fabrics with this paste or in treating such fabrics by immersion processes. The resistance to aging of the pastes may be increased if the latex is, before its working-up, but following the addition of the fatty alcohol heated for a short time to a temperature of 60–80° C. Even better results may be obtained if the polyvinylchloride latex is treated with a water-soluble fatty acid salt of the ammonium or alkylamine type, among which, it is to be understood, are included alkylolamines. The resulting polyvinylchloride thereby becomes in the paste even less soluble in the softener and, as a result, more stable as to viscosity at room temperature or slightly increased temperatures. Only above a specific temperature—i.e., at about 80° C. does the rapid desired gelatinization take place. On the other hand, there are obtained highly fluid, slightly thixotropic, almost newtonic plastisols by adding free fatty acids to the starting polyvinylchloride emulsion, and subsequently working the same up by spray-drying. The resulting dry polyvinylchloride may be ground on suitable grinding or comminution machines.

The polyvinylchloride powders thereby obtained may be mixed with any of the conventional softeners to produce mixtures having a solids content of polyvinylchloride amounting to from 10 to about 70% to form more or less viscous pastes depending on the solids content. The said pastes are free from spots and resistant to aging. The stability against aging may be further increased even up to thirty days by slight heating of the polyvinylchloride emulsion containing the fatty acid compound or derivative thereof prior to the spray-drying. The pastes produced in accordance with the invention are particularly suitable for centrifugal casting or rotation casting processes and produce on gelatinization very smooth and even surfaces. In order to obtain the flow characteristics described, relatively low temperatures must be used in the spray-drying, i.e., temperatures as far as possible below 70° C. If it is desired to obtain dilatant to rheopectic pastes, the spray-drying should be carried out at somewhat higher temperatures, i.e., from 80 to 85° C.

The invention is illustrated in greater detail in the examples which follow, but it is to be understood that the invention is not limited thereto.

EXAMPLE 1

To a polyvinylchloride latex having a solids content of 48% and a high mechanical stability and which had been prepared by connecting vinylchloride, a phosphate buffer, hydrogen peroxide, Mersolate K30 (cogasine sulfonate), in accordance with the conventional polymerization processing, there was added under emulsification 1% of a fatty acid mixture (so-called coconut oil-fatty acid blend of $C_{10}$–$C_{18}$ acids). The resulting mixture was thereafter heated for 10 minutes to 80° C. and then worked up by spray-drying at a dry air starting temperature of between 55 and 65° C. (measured at the separation point of the moist air and polyvinylchloride). The product thereby obtained was particulated on a high-speed stud mill, in the instance a Colloplex mill, to a particle size of $2\mu$ and smaller. Following mixing of the particulate polyvinylchloride with 40% di-octyl phthalate, there was obtained a plastisol which was stable in storage and entirely free from spots and which could be further processed without resort to homogenizing machines. The viscosity of the 60% polyvinylchloride paste produced by the above process amounted to 4,000 cp. (measured with Brookfield Viscosimeter RVT 7 with the spindle 6 at 100 r.p.m., 20° C.). After 15 days and 30 days, respectively, standing time at room temperature, the viscosity of the paste remained unchanged.

EXAMPLE 2

The procedure of Example 1 was repeated but with the heating step of the emulsion omitted. There was obtained a plastisol which demonstrated a pseudo-plastic flow and which had a starting viscosity of 4,000 cp., which after 10 days' standing time rose to 8,000 cp.

EXAMPLE 3

A polyvinylchloride emulsion according to Example 1 which had been treated with 1% fatty acid ammonium salts ($C_{12}$–$C_{18}$ acid) was heated for 10 minutes to 60° C. Following working-up and admixing with 50% of a softener, there was obtained a highly viscous thixotropic paste, the starting viscosity of which at 100 r.p.m. amounted to 2,000 cp. At one revolution, a viscosity of 20,000 cp. was measured. After 14 days' standing time, no change of the viscosity of the paste was observed.

We claim:

1. A process for the production of stable plastisols on the basis of polyvinylchloride, which comprises adding to a polyvinylchloride product comprising polymer particles dispersed in a liquid medium a member selected from the group consisting of fatty acids having 8 to 22 carbon atoms, their ammonium salts, their aliphatic amine salts, fatty alcohols having 8 to 22 carbon atoms and mixtures thereof in an amount of from 0.1 to 5% by weight of polyvinylchloride to obtain an emulsion, heating the emulsion for a period on the order of approximately 60 minutes to a temperature of from 60 to 90° C., drying the emulsion, grinding the dried product thus produced and admixing the dried polyvinylchloride product with a softener to produce the plastisol.

2. A process according to claim 1, wherein said group member is used in an amount of from 0.5 to 2%.

3. Process according to claim 1, wherein said drying is effected by spray-drying.

4. Process according to claim 3, wherein said drying is effected at a temperature below 70° C.

5. Process according to claim 1, wherein said polyvinylchloride liquid product is a latex of polyvinylchloride particles dispersed in a liquid medium.

6. Process according to claim 1, wherein said grinding is effected to produce particles having a size of $2\mu$ and less.

7. Process according to claim 1, wherein said group member is a fatty acid fraction within the range of $C_{10}$–$C_{18}$.

8. Process according to claim 1, wherein said group member is a fatty acid fraction within the range of $C_{12}$–$C_{18}$.

9. A process for the production of stable plastisols on the basis of polyvinylchloride which comprises adding to a latex of polyvinylchloride particles dispersed in a liquid medium a fatty alcohol having 8 to 22 carbon atoms in an amount of from 0.1 to 5% by weight of polyvinylchloride to obtain an emulsion, heating the emulsion for a period on the order of approximately 60 minutes to a temperature of from 60 to 80° C. drying the emulsion, grinding the dried product thus produced, and admixing the dried polyvinylchloride product with a softener to produce the plastisol.

10. A stable plastisol composition comprising an admixture of a softener and up to about 70% of a polyvinylchloride powder obtained by adding to a polyvinylchloride liquid product comprising polymer particles dispersed in a liquid medium, a member selected from the group consisting of fatty acids having 8 to 22 carbon atoms, their ammonium salts, their aliphatic amine salts, and mixtures thereof in an amount of from 0.1 to 5% by weight of polyvinylchloride to obtain as emulsion, heating the emulsion for a period on the order of approximately 60 minutes to a temperature of from 60 to 90° C., drying the emulsion and grinding the dried product.

11. A stable plastisol composition according to claim 10, wherein said dried product is admixed with a softener in an amount sufficient to produce a paste having a solids content of from about 10 to about 70%.

12. A process for the preparation of polyvinylchloride for use in the production of stable plastisols which comprises adding to a polyvinylchloride product comprising polymer particles dispersed in a liquid medium a member selected from the group consisting of fatty acids having 8 to 22 carbon atoms, their ammonium salts, their aliphatic amine salts, and mixtures thereof in an amount of from 0.1 to 5% by weight of polyvinylchloride to obtain an emulsion, heating the emulsion for a period on the order of approximately 60 minutes to a temperature of from 60 to 90° C., drying the emulsion and grinding the dried product thus produced.

13. A process according to claim 12 wherein said group member is used in an amount of from 0.5 to 2%.

14. Process according to claim 12, wherein said drying is effected by spray-drying.

15. Process according to claim 14, wherein said drying is effected at a temperature below 70° C.

16. Process according to claim 12, wherein said polyvinylchloride liquid product is a latex of polyvinylchloride particles dispersed in a liquid medium.

17. Process according to claim 12, wherein said group member is a fatty acid fraction within the range of $C_{10}$–$C_{18}$.

18. Process according to claim 12, wherein said group member is a fatty acid fraction within the range of $C_{12}$–$C_{18}$.

19. A polyvinylchloride product for use in the production of stable plastisols comprising a polyvinylchloride powder obtained by adding to a polyvinylchloride liquid product comprising polymer particles dispersed in a liquid medium, a member selected from the group consisting of fatty acids having 8 to 22 carbon atoms, their ammonium salts, their aliphatic amine salts, and mixtures thereof in an amount of from 0.1 to 5% by weight of polyvinylchloride to obtain an emulsion, heating the emulsion for a period on the order of approximately 60 minutes to a temperature of from 60 to 90° C., drying the emulsion and grinding the dried product.

References Cited

UNITED STATES PATENTS

| 2,948,638 | 8/1960 | Baird et al. | 117—100 |
| 3,208,965 | 9/1965 | Kuhne | 260—30.6 |
| 3,255,132 | 6/1966 | Reinecke | 260—23 |
| 3,318,825 | 5/1967 | Enk et al. | 260—8 |
| 3,324,097 | 6/1967 | Pears | 260—92.8 |
| 3,383,346 | 5/1968 | Smith | 260—23 |

OTHER REFERENCES

Warth: "The Chemistry and Technology of Waxes," 1956, pp. 531, 536, 547, 548.

DONALD E. CZAJA, Primary Examiner

R. A. WHITE, Assistant Examiner

U.S. Cl. X.R.

260—31.8, 92.8